Dec. 1, 1959   F. R. GROSS   2,915,292
HEAT-TRANSFER APPARATUS
Filed Dec. 24, 1952   5 Sheets-Sheet 1
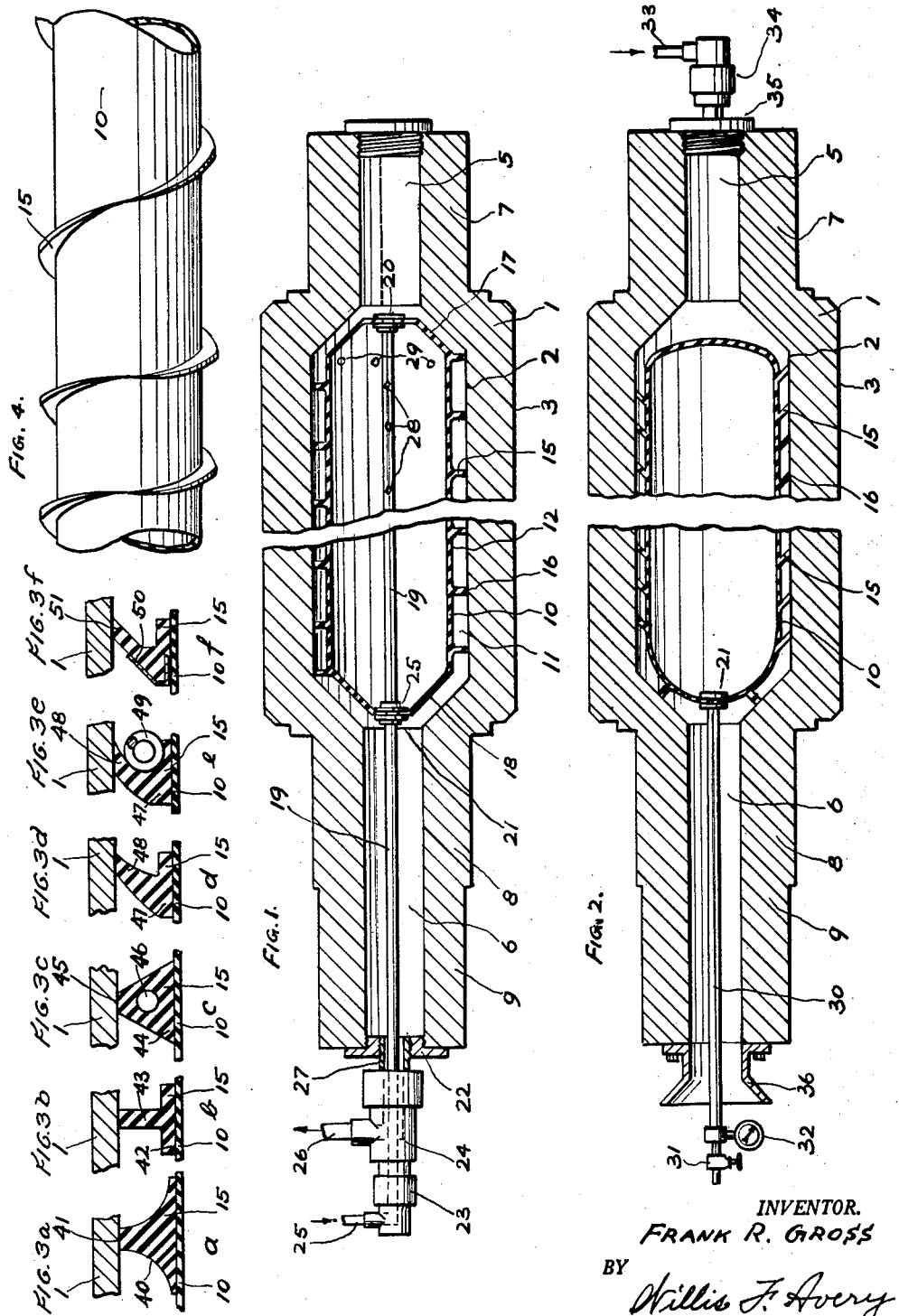
INVENTOR.
FRANK R. GROSS
BY
Willis F. Avery
HIS ATTORNEY.

Dec. 1, 1959  F. R. GROSS  2,915,292
HEAT-TRANSFER APPARATUS
Filed Dec. 24, 1952  5 Sheets-Sheet 2
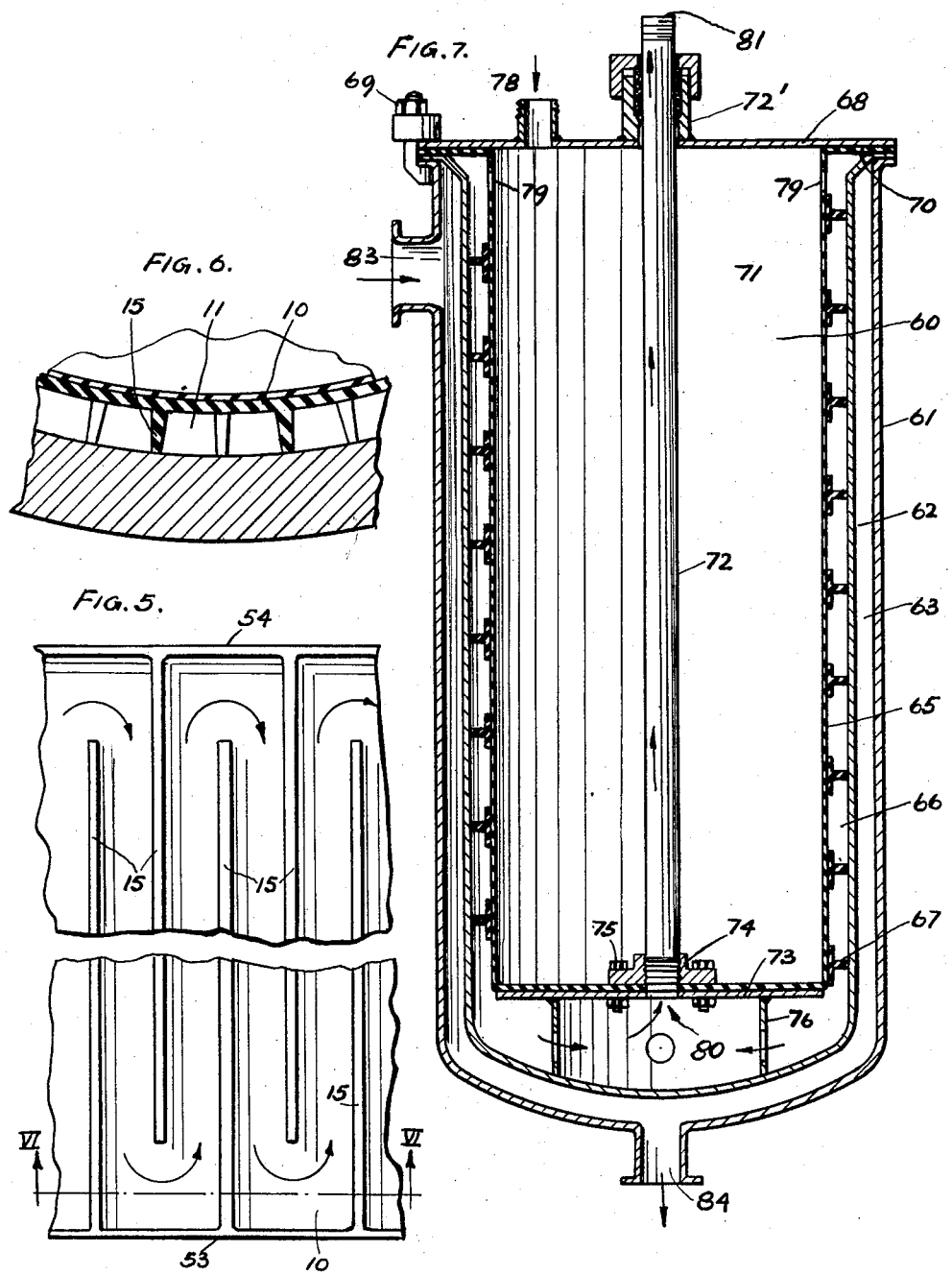
INVENTOR.
FRANK R. GROSS
BY
*Willis F. Avery*
HIS ATTORNEY.

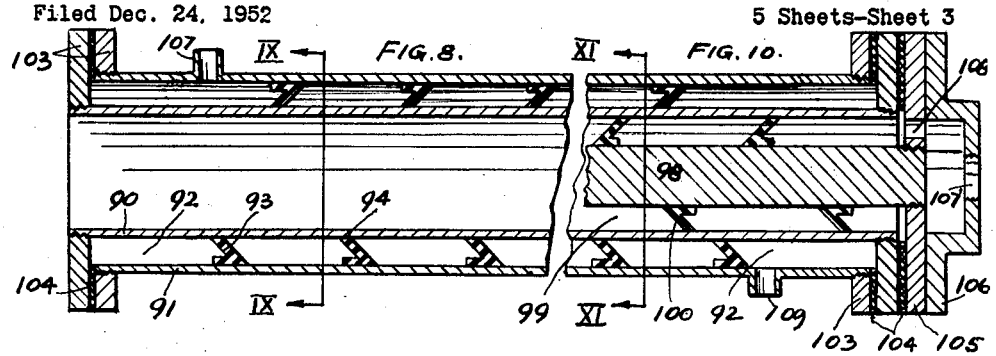
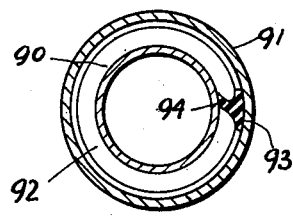
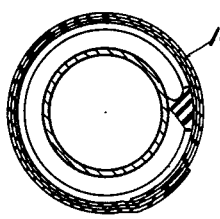
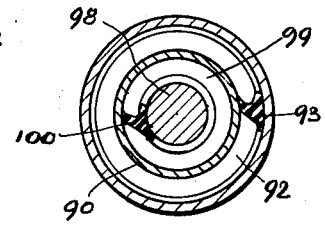
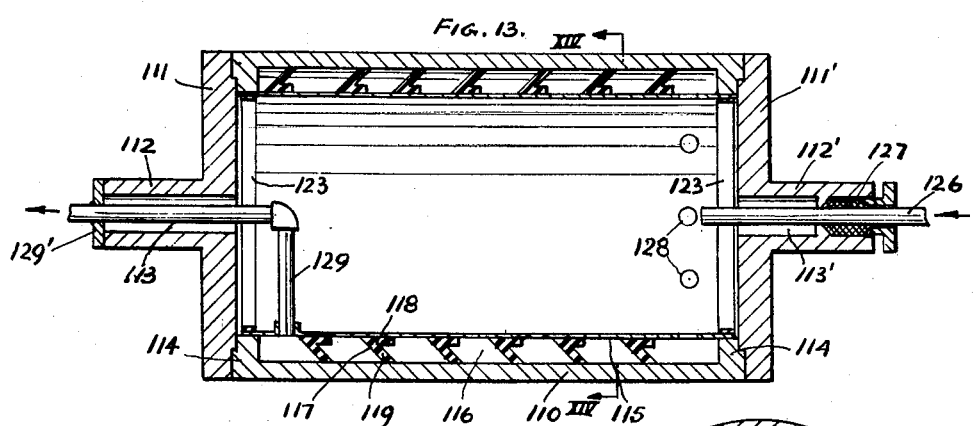
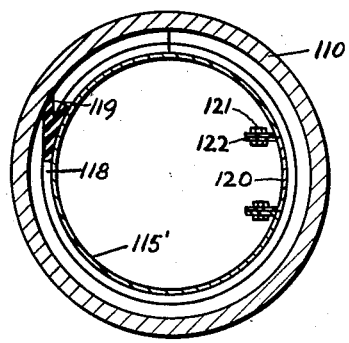
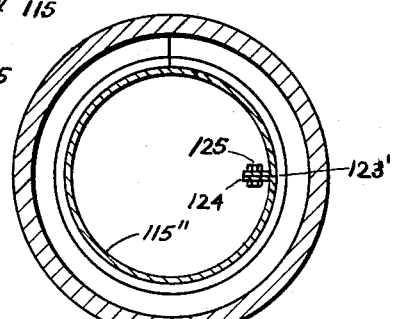
INVENTOR.
FRANK R. GROSS

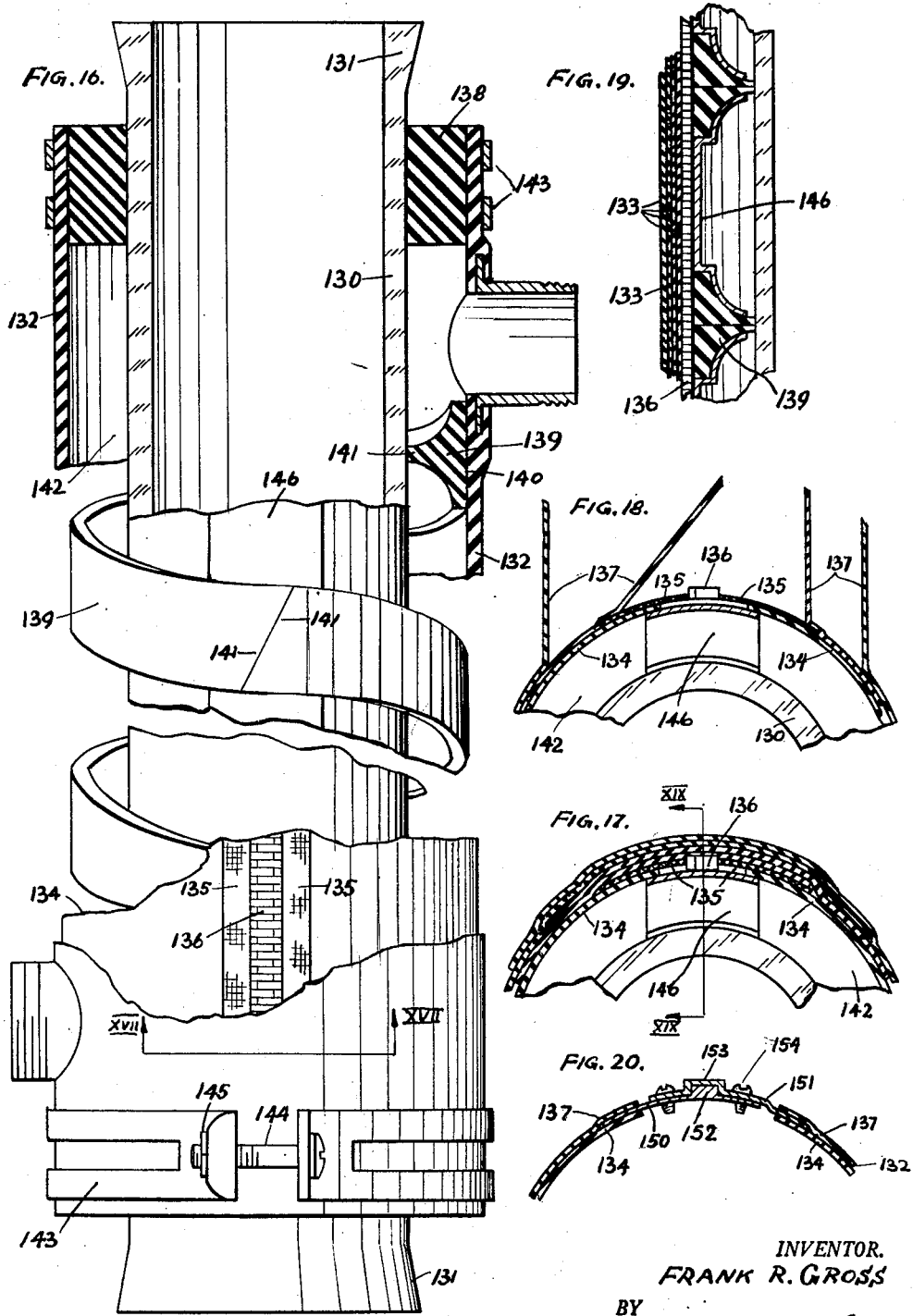

Dec. 1, 1959  F. R. GROSS  2,915,292
HEAT-TRANSFER APPARATUS
Filed Dec. 24, 1952  5 Sheets-Sheet 5
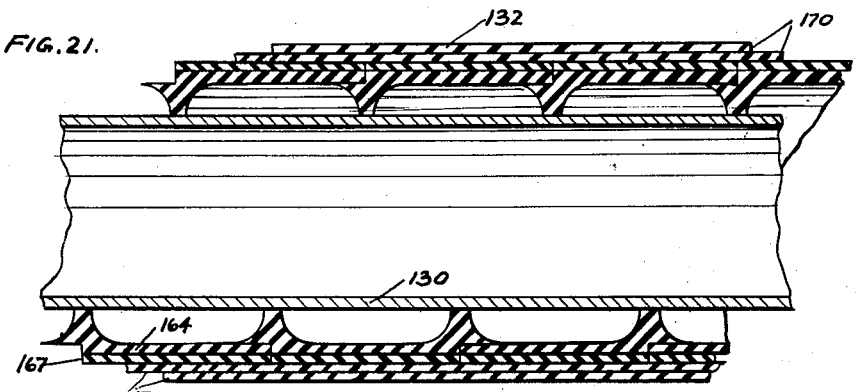
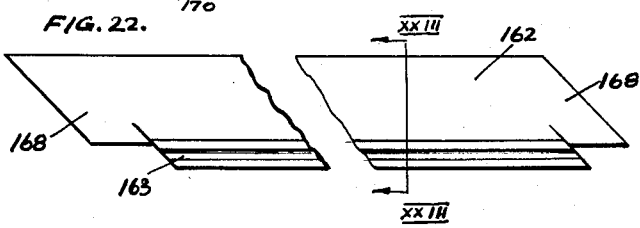
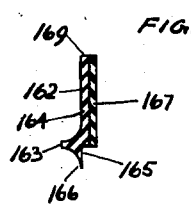
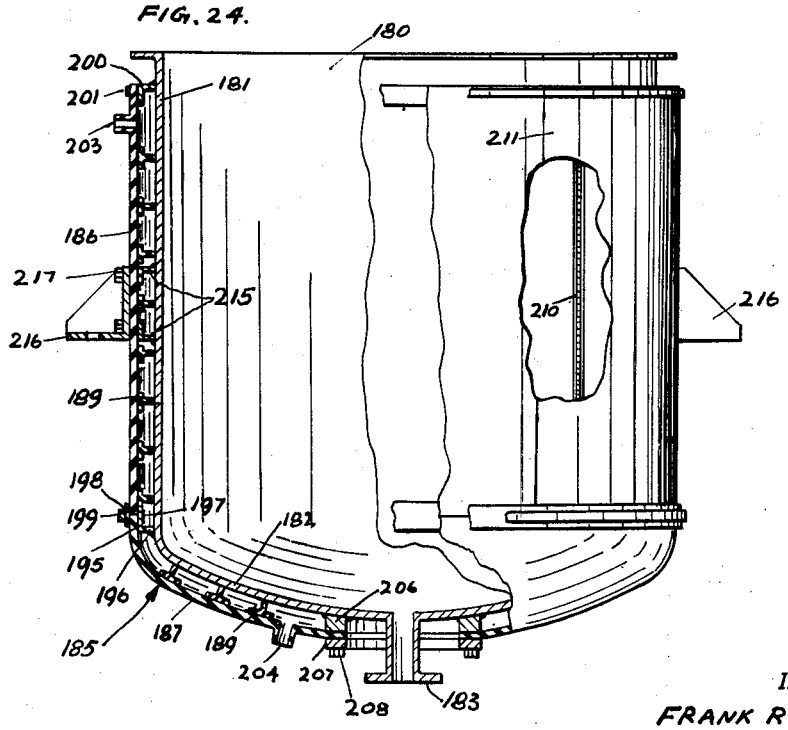
INVENTOR.
FRANK R. GROSS
BY
HIS ATTORNEY.

United States Patent Office 2,915,292
Patented Dec. 1, 1959

2,915,292

HEAT-TRANSFER APPARATUS

Frank R. Gross, Akron, Ohio

Application December 24, 1952, Serial No. 327,741

11 Claims. (Cl. 257—95)

This invention relates to constructions for facilitating the transfer of heat through heat-conducting walls of heat-exchange apparatus by the circulation of fluid heat-transfer medium in contact with the heat-conducting walls, and to structures for forming passages, contiguous to the heat-conducting walls, through which fluid heat-transfer medium may be circulated.

In many forms of heat-exchange apparatus, the primary heat-conducting wall is of a generally cylindrical shape, and frequently a multiplicity of such heat-conducting cylindrical walls are assembled into a multi-unit heat-exchange apparatus. Such heat-exchangers normally comprise, in addition to the heat-conducting cylindrical wall, means for maintaining a fluid heat-transfer medium in contact with the said heat-conducting wall, usually a cylinder of greater or less diameter than, and arranged concentrically with respect to, said heat-conducting cylindrical wall, thus forming an annular space through which the heat-transfer medium may be circulated, and, also in many cases, a system of metal baffles in order to cause the fluid to circulate in the annular space through elongated passageways and at greater speeds, thus to increase the heat-transfer efficiency of the apparatus.

In heat-exchangers of the type described in the preceding paragraph, it is inevitable that scum, slime, dirt, and debris will collect on the surfaces exposed to the fluid heat-transfer medium, especially where water from natural sources is used as the heat-transfer medium, and that these accumulations materially cut down the efficiency of the heat-exchanger apparatus. Further, where metal baffles are used in the annular space through which the heat-transfer medium is circulated, it is difficult to secure watertight joints between the edges or tips of the baffles and the heat-conducting surface, and, where a tight joint is obtained, it is difficult satisfactorily to assemble the same and usually the two corrode and adhere to each other so that it is not possible to disassemble the parts for cleaning without damaging some of the parts to such extent as to render them unsuitable for further use.

It is the purpose of this invention to overcome the disadvantages hereinabove noted of present heat-exchangers by providing in heat-exchangers of the type hereinabove described a casing for the heat-conducting wall, which casing may be either inside or outside the heat-conducting wall and of such less or greater diameter as shall provide a suitable annular space for the heat-transfer medium, and which casing shall have associated with it, either joined thereto or integral therewith, flexible and elastically compressible partitions, or projecting rib structures, of such dimensions as to extend across the annular space and when in operative position to be held under elastic compression against the heat-conducting surface to form a fluid-tight joint with the heat-conducting wall.

Preferably the partitions are made of rubber, or a rubber-like material, since materials of this type are not only flexible and elastically compressible, but also, when wet with water, slide easily over the surfaces of heat-conducting walls. In other words, water is an excellent lubricant for rubber. The term "rubber" is herein employed in a generic sense to include any elastomer, that is, any rubber-like material which has the property of being flexible and elastically compressible, and capable of having its movements in compressive contact with a heat-conducting wall effectively lubricated by water. It may vary in degrees of firmness within the range normally pertaining to gasket packings.

These flexible and elastically compressible partitions of rubber permit the casing with which they are associated to be readily assembled in operative position with respect to the heat-conducting wall member because of the flexibility and compressibility of the partitions and of the effective lubrication of water for rubber, and also as readily disassembled, and when in assembled position to form fluid-tight joints between the edges of the partitions and the heat-conducting wall by reason of the elastic-compression stresses in the partition acting in directions substantially normal to the heat-conducting wall and to the casing spaced therefrom.

This invention is applicable to any exchanger having a heat-conducting wall which is substantially annular in every cross-section at right angles to an axis, and includes heat-exchangers in which the heat-conducting wall is of a frusto-conical shape or of a segmental-spheroidal shape, etc. The term "cylindrical" as used in this specification and in the appended claims is intended to include any heat-conducting wall, or a casing therefor, which wall or casing is substantially annular in every cross-section at right angles to a straight line axis.

Other objects and advantages of the invention will be apparent from the disclosure of the several embodiments of the invention as hereinafter more specifically described and illustrated in the drawings, in which:

Fig. 1 is a sectional view taken longitudinally of a heat-exchanger unit in which the heat-conducting wall is in the form of a generally cylindrical roll, the casing carrying the flexible partitions being located within the heat-conducting wall;

Fig. 2 is a view similar to Fig. 1 illustrating a modification of the heat-exchanger structure;

Figs. 3a, 3b, 3c, 3d, 3e and 3f are cross-sectional views illustrating some of the various shapes the flexible compressible partition may have;

Fig. 4 is a fragmentary view in side elevation of the casing illustrating a modified form of partition arrangement;

Fig. 5 is a fragmentary view in side elevation of a casing carrying another modified form of partition arrangement;

Fig. 6 is a sectional view taken substantially along line VI—VI of Fig. 5;

Fig. 7 is a longitudinal sectional view of a heat-exchanger suitable for use as a condenser, cooler or heater;

Fig. 8 is a fragmentary sectional view taken longitudinally of a heat-exchanger unit suitable for assembly in a multi-unit heat-exchanger;

Fig. 9 is a cross-sectional view of the heat-exchanger of Fig. 8 taken along line IX—IX of Fig. 8;

Fig. 10 is a fragmentary longitudinal sectional view illustrating a modification of the heat-exchanger of Fig. 8;

Fig. 11 is a cross-sectional view of the heat-exchanger of Fig. 10 taken along line XI—XI of Fig. 10;

Fig. 12 is a cross-sectional view of a modification of the heat-exchanger of Figs. 8 and 9;

Fig. 13 is a longitudinal sectional view of another modification of heat-exchanger;

Fig. 14 is a cross-sectional view of the heat-exchanger of Fig. 13 taken along line XIV—XIV of Fig. 13;

Fig. 15 is a cross-sectional view similar to Fig. 14, and showing a modified form of the casing;

Fig. 16 is a view in part in elevation, in part in section and in part with portions broken away illustrating a still further modification of a heat-exchanger embodying my invention;

Fig. 17 is a fragmentary cross-sectional view along line XVII—XVII of Fig. 16;

Fig. 18 is a fragmentary cross-sectional view similar to Fig. 17, but with plies of the casing in position for assembly;

Fig. 19 is a fragmentary cross-sectional view along line XIX—XIX of Fig. 17;

Fig. 20 is a fragmentary cross-sectional view similar to Fig. 17, illustrating a modified form of fastener for the casing;

Fig. 21 is a cross-sectional view of a modified form of the heat-exchanger shown in Fig. 16;

Fig. 22 is a plan view of a strip which is embodied in the casing of the heat-exchanger of Fig. 21;

Fig. 23 is a cross-sectional view taken along line XXIII—XXIII of Fig. 22; and

Fig. 24 is a longitudinal sectional view of still another form of heat-exchanger.

Referring to Figs. 1 through 5 of the drawings, the numeral 1 designates a wall member, annular in every cross-section, normal to a straight line axis, through which heat is to be conducted, and is generally referred to in this specification as the cylindrical heat-conducting wall. Specifically illustrated is a roll having the heat-conducting wall 1, annular or ring-shaped in cross-section, and having an inner cylindrical surface 2 and an outer cylindrical surface 3. As shown, the hollow interior formed by the wall 1 has extensions 5 and 6 of reduced diameter at each of the end portions 7 and 8, the latter serving as journals by which the heat-exchanger is supported as a roll of a mixing machine, calender or the like. The end portion 8 is provided with an extension 9 forming part of a driving connection (not shown) for imparting rotary movement to the roll.

Referring particularly to Fig. 1, a hollow casing 10 is disposed within the roll and is of such size and shape as to provide an annular space 11 between the inner surface 2 of wall 1 and the surface 12 of the casing 10, which surface 12 forms the boundary of the annular space 11 through which the fluid heat-transfer medium is circulated.

Attached to surface 12, or integral with the casing 10, are partitions 15 which extend across the annular space 11 and are of such size and shape that when in operative position the free edges 16 of the partitions 15 are held in compressive contact with the surface 2 of the wall 1, thus forming a fluid-tight joint between the partition edges 16 and the heat-conducting wall 1. As shown in Fig. 1, the partitions 15 are integral with the casing 10, although it is to be understood they may be separate structures attached to casing 10 on its side 12 facing the annular space 11.

The heat-transfer fluid medium is admitted to and discharged from the annular space 11 in any convenient manner. Thus, in Fig. 1, the casing 10 has two end portions 17 and 18 which are provided with central openings for the reception of a pipe 19. Clamp structures 20 and 21 engage the pipe 19 and the opposite ends 17 and 18 to form a fluid-tight seal with the ends 17 and 18. The pipe 19 extends outwardly through a coupling member 22, the latter forming a support and connections for a pair of rotary unions 23 and 24, which are conventional and need not be described here, it being sufficient to point out that each is effective to provide a stationary fluid-tight connection with the rotary part. The rotary union 23 connects with the inlet pipe 25 and the rotary union 24 connects the exhaust pipe 26 with the exhaust connection 27 which has a threaded connection with cap 22, secured to the extension 9. The pipe 19 has openings 28 through which fluid passes into the inside of casing 10. The casing 10 has openings 29 from which fluid passes from the casing 10 into the annular space 11.

The casing 10 of the heat-exchanger of Fig. 1 is formed of a flexible material, as are the partitions 15 which as shown are integral with the casing 10, and hence the casing 10 after having been attached to pipe 19 may be readily inserted into the cavity within the heat-conducting wall 1, as by introducing the pipe 19 through opening 5 in end 7 and pulling it through opening 6 of end 8 until the parts assume the position shown in Fig. 1. The casing 10 and partitions 15 are of such size and shape as to cause the edges 16 of the partitions 15 to resiliently press against the inner surface 2 of wall 1. The introduction of the heat-transfer medium into the interior of casing 10, as through apertures 28 in pipe 19, builds up within the casing 10 a somewhat higher pressure than that of the heat-transfer medium in space 11, the pressure of the heat-transfer medium being gradually lowered as it passes from the inlet 25 to the outlet 26. Hence, the casing 10 is kept in an extended condition and the partitions 15 in a compressive contact with the surface 2 of the heat-conducting wall 1. The casing 10 is readily removed from the cavity within the heat-conducting wall 1, by disconnecting the coupling member 22 and pulling the pipe 19 and the casing 10 attached thereto outwardly through opening 6 of end 8. The casing 10 and its partitions 15 can then be cleansed of foreign matters, as also can the inner surface 2 of wall 1, and the cleansed parts reassembled as above described.

The construction of Fig. 2 is similar to that of Fig. 1 and like parts have been designated by like reference numerals. The casing 10 in this modification is provided with a pipe 30 which extends outwardly through the heat-exchanger end 9 and is provided with a valve 31 and pressure gauge 32. The heat-transfer medium is admitted through pipe 33 connected to a rotary union 34 carried by a closure member 35, which is screw-nut fitted into opening 5 of end 7. The passage 6 discharges the heat-transfer fluid into a funnel outlet 36 bolted to end 9 in alignment with the passage 6.

The casing 10 and the partitions 15 in the structure of Fig. 2 are, as in the structure of Fig. 1, formed of flexible material and are assembled in much the same way. The casing 10 is clamped at one end to pipe 30, as by clamp members 21, and the pipe 30 is inserted through end opening 5, on through the cavity within wall 1 and through opening 6 until the casing 10 assumes the position within the heat-conducting wall shown in Fig. 2. Through valve 31, a fluid medium is introduced into the casing 10, the pressure as shown by the gauge 32 being maintained slightly higher than the pressure of the heat-transfer medium admitted through pipe 33. The casing 10 is thereby kept in an extended condition and the partitions 15 in flexible pressure contact with the inner surface 2 of the heat-conducting wall 1. The casing 10 is also readily removed from its position within the heat-conducting wall 1 by shutting off the supply of heat-transfer medium, releasing the pressure within the casing 10 and pulling the casing outwardly through opening 6. The parts may then be cleansed and reassembled as above described.

In the assembly and disassembly of the casing 10 of both the heat-exchangers of Figs. 1 and 2, it is desirable to have the outer surfaces of casings 10 and partitions 15 thoroughly wet with water, since water is, as has been above pointed out, an excellent lubricant for rubber.

In Figs. 3a, 3b, 3c, 3d, 3e and 3f are shown modifications of the partition 15, the heat-conducting wall 1 and the casing 10 having the same numerals as in Figs. 1 and 2. In Fig. 3a, the partition 15 is in cross-section in the form of a truncated triangle, the sides being dished at 40 and the tip 41 being of considerable width to give a good bearing surface of the partition 15 against the wall 1; in Fig. 3b, the partition 15 in cross-section has a base portion 42 and a riser portion 43 extending from the central portion of the base 42; in Fig. 3c, the partition 15 is in cross-section a truncated triangle, with base 44 at casing 10 and cut-off apex 45 at wall 1, the partition 15 in this form also having a hollow opening 46 extending the length of the partition 15 to give to the latter greater flexibility and compressibility; in Fig. 3d, the partition 15 is in cross-section in the shape of an acute angle, and comprises a base portion 47 having an extension 48 arising from one side of base 47 and projecting over the other side of base 47; in Fig. 3e, the partition 15 is similar in cross-section to that of Fig. 3d but with a curved recess on the inner side of the angle in which a spiral spring 49 is disposed; and in Fig. 3f, the partition 15 is similar in cross-section to that of Fig. 3d but has a thin metal reinforcement 50 imbedded in and/or attached to the base and the outer extending side of the partition 15 to reinforce and hold the edge 51 of the partition in firm compressive contact with the wall 1.

In each of the partition structures of Figs. 3d to 3f, the flow of the heat-transfer medium is in such a direction that the differential fluid pressure on each side of the partition 15 acts to press the tip of the partition 15 with a positive force against the inner surface 2 of the heat-conducting wall 1. This is illustrated in the construction of Fig. 2 wherein the heat-transfer medium flows from right to left with gradually diminishing pressure and hence the differential pressure on each side of the partition 15 acts to press the partition so as to hold it with a positive resilient compressive contact against the surface 2 of heat-conducting wall 1. In all embodiments of this invention, an essential feature is that the partition contact the heat-conducting wall, when the heat-exchanger is in operation, with a flexible compressive contact that provides a substantial fluid-tight joint between partition and the heat-conducting wall.

The partition 15, in any of the forms shown in Figs. 3a to 3f, inclusive, may be arranged with respect to the casing 10 in any manner which will give the heat-transfer fluid a rapid and scrubbing movement through the space 11, so that air pockets are eliminated and the rate of heat-transfer approaches a practical optimum. As shown in Figs. 1 and 2, the partition 15 is disposed spirally around the casing 10. In Fig. 4, the partition 15 is disposed spirally with the distance between each convolution of the spiral progressively greater. In Figs. 5 and 6, the partitions 15 extend alternately inwardly from closure partitions 53 and 54 disposed at opposite ends of casing 10. The closure partitions 53, 54 are provided with openings (not shown) through which fluid admitted at one end of space 11 may be exhausted at the other end.

In Fig. 7 is shown a form of heat-exchanger normally employed for the heating or cooling of a fluid medium, such as the heating of a liquid or the condensation of a vapor. It comprises essentially an annular substantially cylindrical chamber 60, having an outer wall 61 and an inner heat-conducting wall 62, with an annular-space 63 between the walls 61 and 62 for the circulation of the fluid to be heated or cooled. Within the chamber 60 is a substantially cylindrical casing 65 of rubber or rubberlike material of such size and shape as to provide an annular space 66 of limited cross-sectional area between the casing 65 and the inner heat-conducting wall 62. Partitions 67, carried by or integral with the casing 65, extend across the space 66 and contact the heat-conducting wall 62 so as to provide an elongated passage for the flow of fluid through the space 66. The chamber 60 and interior of casing 65 are closed by a circular metal member 68, which is clamped to the chamber 60 by clamps 69 and holds the extended end portion 70 of casing 65 in fluid-tight relation to the chamber 60 and casing 65, to form a chamber 71 inside the casing 65. The closure member 68 has a centrally disposed pipe 72 extending through a packing gland 72' of conventional construction, so that the pipe 72 is free to slide in and out to compensate for expansion and contraction of the heat-exchanger parts. At the lower end of pipe 72 is attached a circular plate 73, which supports the casing 65, the casing 65 being clamped thereto by a flange 74 into which the lower end of pipe 72 is threaded, the plate 73 and the flange 74 being held in position by bolts 75. Attached to the side of the plate 73, opposite that to which the casing 65 is attached, is a collar member 76 which acts as a support for plate 73, casing 65 and pipe 72.

Suitable inlets and outlets are provided for the circulation of the heat-transfer fluid through the space 66 and for the fluid being treated through the annular space 63, and may be located at a number of places in the heat-exchanger apparatus. As shown, the heat-transfer fluid is admitted through inlet 78 into the chamber 71 so as to fill the chamber 71 and press the casing 65 and partitions 67 into fluid-tight compressive contact with the heat-conducting wall 62, the heat-transfer fluid overflowing from chamber 71 into the space 66 through openings 79 in the casing 65, thence through the spiral passages made in the space 66 by the partitions 67. The fluid passes into a bottom chamber 80, and thence through the pipe 72 to outlet at 81. The fluid to be heated or cooled enters the annular space 63 through inlet 83, flows downwardly through space 63 and is discharged at outlet 84.

Figs. 8 and 9 disclose another form of heat-exchanger, in which the heat-conducting wall 90 has a casing 91 surrounding the wall 90, and having in the annular space 92 between the wall 90 and casing 91 spirally disposed partitions 93 similar to the type disclosed in Fig. 3d, although it is to be understood that other forms of partition may be employed. The partitions 93 are made of flexible and compressible material and are of such size and shape and are so supported by the casing 91 that the edges 94 of the partitions 93 bear against the heat-conducting wall 90 with a fluid-tight sealing pressure. This form of heat-exchanger is designed to be a unit of a multiple tube heat-exchanger, although it is obvious that it may operate effectively as a single unit.

As shown in Fig. 9, the casing 91 is of metal or of glass or of other more or less rigid material and the flexible and compressible partitions 93 are carried on the casing 91 so as to bear with compressive force against the heat-conducting wall 90.

It is in some cases desirable to have not only the heat-transfer fluid medium traverse an elongated and circuitous path but also to have the fluid being heated or cooled traverse an elongated and circuitous path. Such a heat-exchanger is illustrated in Figs. 10 and 11. The heat-conducting wall 90, the casing 91 and the partitions 93 in the annular space 92 are the same as in Figs. 8 and 9. Within the heat-conducting wall 90 is a cylindrical member 98, which may be a solid or hollow cylinder, of such size that an annular space 99 is formed between the wall 90 and the cylindrical member 98. Supported by the cylinder 98 is a spiral partition member 100 of flexible compressible material and of a size and shape to be held in resilient compressive contact with the heat-conducting wall 90.

The casing 91 may, however, be made of other than rigid materials. As shown in Fig. 12, the casing 91 is made up of a plurality of convolutions or layers of fabric 102 to produce a substantially non-stretchable but flexible casing. Woven fabrics of various materials have been found to be satisfactory. Experience to date has shown that fabrics woven from cords or threads made of glass fibers or filaments are preferable since such fabrics are practically non-stretchable and the temperatures normally present in heat-exchangers do not adversely affect such fabrics. It is to be understood, however, that other fabrics made from natural and/or artificial fibers or filaments have also been satisfactorily used.

In the heat-exchangers of Figs. 8 to 12, any conventional inlets and outlets may be provided. End closure members 103 with packings 104 are shown in Fig. 8. In Fig. 10, the central cylinder 98 is carried by a web member 105 which is secured to closure member 103 by any suitable means (not shown). An end cap 106 is provided with an inlet 107' to supply fluid to the space 99 as through opening 108. Inlet 107' and outlet 109 are shown by way of example.

In the construction of Fig. 13, the heat-exchanger is in the form of a roll, with a heat-conducting cylindrical wall 110, supported at each end by circular plates 111, 111' having centrally-disposed outwardly-projecting portions 112, 112' with axially-disposed openings 113, 113'. The projections 112, 112' serve as journals for the roll and the openings 113, 113' as means for admission to the interior of the roll. The heat-conducting cylindrical wall 110 has at each end thereof inwardly-projecting flanges 114 which serve as seats for a cylindrical casing 115, of such size as to form between the casing 115 and wall 110 an annular space 116. The casing which is of sheet metal or other rigid material supports a spirally-disposed flexible and compressible partition structure 117 having a base portion 118 and an inclined leg portion 119, the free edge of which contacts the heat-conducting wall 110 with a compressive force which makes a fluid-tight seal. In this form of heat-exchanger, the wall 110 and casing 115 are assembled prior to attaching the end closure plates 111 to wall 110. This is readily accomplished by moving the casing 115 with its partitions 117 attached thereto from right to left (as shown in Fig. 13), with the heat-conducting wall 110 and the casing 115 being disposed coaxially, and rotating either the wall 110 or the casing 115 and thus "screwing" the casing and partitions past the flange 114 into the interior of the roll. To facilitate assembly, it may be desirable in some cases to have the casing 115', as shown in Fig. 14, made with a narrow section 120 which is removable. With the section 120 removed, the assembled casing 115' and partitions 117 are more easily inserted within the wall 110, after which the section 120 is forced in place and secured by bolts 121 clamping the flanges 122 together. Rings 123 are pressed in the ends of casing 115" to firmly secure the casing 115 within the wall member 110. A modified casing structure is shown in Fig. 15, in which the casing 115" is split at 123', with inturned flanges 124 being secured by bolts 125. In assembly, one flange 124 is pulled in over the other flange 124 to make the casing sufficiently smaller in section to move readily into the space within the wall member 110, then forced into place and bolted.

It is to be understood that the partition structure 117 may be of any suitable form, such as shown in Figs. 3a to 3f, and that the partitions are of such height from base to edge that when placed within the cylindrical wall they are deformed somewhat and compressed, so as to form a fluid-tight seal with the wall member 110.

Any suitable inlet and outlet for the heat-transfer fluid may be provided. As shown in Fig. 13, an inlet pipe 126 passes through opening 113 of one of the journals 112, a packing gland 127 of conventional structure being provided to seal off the opening 113. The heat-transfer fluid passes through openings 128 into the annular space 116 and through the spirally elongated passage formed by the partition 117 to a discharge pipe 129, which leads the fluid outwardly through an end closure 129' in opening 113 at the opposite end of the wall member 110. This pipe may be attached to casing 115 prior to assembly of the end plates 111. It will be noted that the flow of heat-transfer medium is in such direction that the differential pressures on opposite sides of the angular partitions act to press positively the tips of the partitions 117 in lip-sealing contact with the heat-conducting wall 110.

It is obvious that the heat-exchanger of Fig. 13 can be readily disassembled for cleaning the parts contated by the heat-transfer fluid from accumulated scum and dirt, and then reassembled for normal service.

A further modification of a heat-exchanger embodying my invention, shown in Figs. 16 to 20, is adapted for use in a multiple unit heat-exchanger, although it obviously can be used as a single unit. Basically it consists of a heat-conducting wall member 130, which may be glass or other rigid heat-conducting material, having outwardly thickened end portions 131 to facilitate assembly in a multi-unit heat-exchanger in a manner well known in the art. A casing 132 is made removable without detaching the heat-conducting wall member from the other heat-exchanger parts and consists essentially of a cylindrical body built up of a number of plies of flexible but substantially non-stretchable rubberized fabric. As shown, the casing 132 is made up of plies 133 of rubberized fabric, built one on the other so as to give the desired flexibility, non-stretchability and strength. Preferably, the casing is built on a mandrel or cylindrical form, although it may be built flat and later forced into cylindrical shape. As shown, one or more inner plies 134 of a length equal to the length of the casing 132 and of a width slightly less than the circumference of the casing have attached to the lengthwise edges built-in slide fastener strips 135 of conventional design, such as are employed on clothing, said strips 135 having interlocking hook-structures 136 common to slide fastener structures. One or more outer fabric plies 137, of greater width than the inner fabric plies 134, so as to form an overlapping and inter-leafing seam, as shown in Figs. 17 and 18, are attached to the inner plies 134 except for the portions contiguous the seams.

Attached to the fabric plies 134, to which the slide fastener strips 135 are secured, and which, when assembled, constitute the inner face of the casing 132 are end-sealing members 138 and partition members 139 which may be of any of the forms of Figs. 3a to 3f, the base portion 140 being secured, as by cementing or vulcanization, to the inner ply 134 of the casing 132. The partition members 139 are so disposed on the casing 132 that when the casing 132 with its partitions 139 are wrapped around the heat-transfer wall 130, the ends 141 of the partition members will abut one another to form a continuous partition spirally dividing the space 142 between the heat-conducting wall 130 and casing 132 into an elongated spiral passage.

When the casing sheet 132 with its end closure members 138, partition members 139 and slide fastener 136 have been assembled around the heat-conducting wall 130, the two longitudinal edges of the slide fastener are drawn together by the pull slider of the slide fastener 136 so as to hold the ends 141 of the partitions 139 in pressure contact with the wall 130 and the partitions under compression between the wall 130 and casing 132. The free ends of the outer plies 137 are drawn tightly over the slide fastener and cemented down, interleafing the fabric ends to give a reinforced closure, as shown in Fig. 17. A standard clamp 143, such as a well known hose clamp, is then placed about the ends of the casing 132, and drawn tight by means of bolts 144 and nuts 145.

In certain installations, it has proved to be advantageous to insert metal clips 146 between the partition members 139, at the points 141 where the partition members 139 abut, so as to hold in alignment the abutting partitions and to give support to the slide fastener 136 during the closure of the casing. In many installations the metal clips 146 should be omitted to give greater flexibility to the assembled casing 132.

In lieu of the slide fasteners 136, any other well known means for drawing together the longitudinal edges of casing 132 may be employed. Thus, in Fig. 20 is shown a metal band 150 inserted between and firmly joined to inner fabric plies 134 and outer fabric plies 137 of one of the longitudinal edges of casing 132 and a similar metal band 151 inserted between and firmly secured to the other of the longitudinal edges of the inner plies 134 of the casing 132. The band 150 is provided with a protrusion or tenon 152 and the band 151 with a groove or mortise 153. The tenon 152 and mortise 153 are so disposed that when the casing 132 has been wrapped around the heat-conducting wall 130 under such tension as to place the partition 139 under compression between the heat-conducting wall 130 and the casing 132, the tenon 152 and mortise 153 will be held in interlocking relation by means of screws 154.

In Figs. 21 to 23, there is shown a modification of the construction of Figs. 16 to 20, in which the wrap-around casing 132 is formed directly on the heat-conducting wall 130, and not formed prior to application to the heat-conducting wall 130. A strip 162 of flexible and compressible material, such as rubber or any elastomer, of sufficient length to wrap spirally around the heat-conducting wall 130 is formed, as by extrusion or in any other manner. The strip 162 has a projecting partition member 163 extending along one edge of the base portion 164, the base 164 being under-cut at 165, the depth of the cut being that of the thickness of the base portion 164, and leaving a lip 166. A reinforcing rubberized fabric 167, such as glass fabric or other substantially non-stretchable fabric, is cemented or vulcanized to the base portion 164 and is substantially coextensive therewith. As shown in Fig. 22, the partition member 163 does not extend to the ends 168 of the strip 162, but terminates sufficiently short thereof to permit the ends 168 of the strip 162 to be wrapped around the end closure members 138 and be sealed thereto by clamps 143. See Fig. 16.

In assembling the casing member 132 of Figs. 21 to 23, one of the ends 168 of strip 162 is wrapped under tension around the end closure members 138, already assembled on heat-conducting wall 130, and the end 168 and closure member 138 are held by clamp 143 firmly in place on heat-conducting wall 130. The strip 162 is then wound spirally around the wall 130 under considerable tension so as to place the partition member 163 under compressive contact with the wall 130. It will be noted that edge 169 of strip 162 enters into and fills the under-cut portion 165 so as to form a tight spiral seam and a smooth cylindrical exterior. Layers of substantially non-stretchable fabric 170 are then wrapped under tension around the spirally wrapped strip 162, both as a reinforcement and to exert a force inwardly directed which holds the partition members 163 in compressive contact with the heat-conducting wall 130. As will be readily understood, the other end 168 of strip 162, after the spiral wrapping, is secured to the end closure 138 and wall 130 by means of the clamp 143 at that end of the heat-exchanger. The reinforcing wrappings 170 are cemented to strip 162 and to each other to form a practically integral casing 132 for the heat-conducting wall 130. Through the spiral passages formed by partitions 163, the heat-transfer fluid is conducted to effect the heat-conductance through wall 130.

To disassemble the casing 132 of the constructions shown in Figs. 16 to 23, the fabric wrappings are loosened from each other by suitable solvents, unrolled and then removed, by opening the fastenings in the structure of Figs. 16 to 20 and by unwrapping the strip 162 in the structure of Figs. 21 to 23. The parts can then be cleaned of film, scum, dirt and the like, which cut down the efficiency of the heat-exchanger, and then reassembled into operative position.

In Fig. 24 is shown a still further modification of heat-exchanger, suitable for large chemical reactor kettles or reactors, and like large production apparatus, and consists of a receptacle 180, having a cylindrical heat-conducting wall portion 181 and a bulging bottom wall portion 182, in which there may be an outlet 183. It is to be understood that the kettle 180 may have inlets and outlets disposed in a cover (not shown) as is a common practice in the art, in which construction the outlet 183 in the bottom of the kettle may be omitted.

The casing 185 is also made in two parts, an upper cylindrical portion 186 and a lower concave portion 187. As shown in the drawings, the upper and lower casing members 186 and 187 are constructed of rubberized fabric, the fabric being substantially non-stretchable, and carry the partition members 189. The size and shape of the casing members 186 and 187 are such as to form a space of practically uniform flow area between the kettle 180 and the casing members 186 and 187. Both the casing members 186 and 187 carry partition members 189, which may be of any of the types shown in Figs. 3a to 3f, and which have a height such that the partitions are held in compressive contact with the heat-conducting walls 181 and 182.

The casing members 186 and 187 are each made separately and then assembled in position on the heat-conducting walls 181 and 182 of the kettle 180. Such assembly may be effected in any convenient way, including those disclosed in the prior examples in this application. As shown, an L-ring 195 is welded or otherwise positioned at the lower end of the cylindrical wall portion 181, the ring having openings 196 for the passage of the fluid heat-transfer medium therethrough. The upper casing member 186 and the lower casing member 187 are placed in position, with the lower circular edge of the upper casing member 186 in abutting relation with the upper edge of the lower casing member 187, as at 197. A sealing strip 198 and a clamp 199 hold the two members 186 and 187 in fluid-tight abutting relation and in fact make the casing 185 an integral structure.

It is to be understood that the casing 185 may be made in one integral member, in which case the L-ring 195 and clamp 199 may be omitted. The casing 185 is supported at its upper end in any suitable manner. As shown, an L-ring 200 is welded to the kettle 180 and the upper edge portion of the casing 185 clamped thereto by conventional clamping member 201.

Any suitable inlets and outlets for this heat-transfer fluid medium may be provided. As shown, an inlet 203 is secured to the upper portion of casing member 186, and an outlet 204 is provided at the bottom of casing member 187. The latter consists of a ring 206 welded or otherwise secured to the wall portion 182 and a mating ring 207. The lower edges of casing member 187 are clamped in fluid-tight relation between the rings 206 and 207, as by bolts 208.

The upper casing member 186 may be constructed in any of the ways indicated in connection with the forms of this invention heretofore described. As shown, the upper casing 186 is constructed in the manner illustrated and described above in connection with Figs. 16 to 19, the slide fastener 210 and overlapping plies 211 corresponding to slide fastener 136 and plies 137 of the earlier-described construction.

When it is desirable to support the kettle at an intermediate zone of the kettle, a pair of clips or spacers 215 are welded or otherwise secured to the kettle, at opposite sides or at various spaced distances circumferentially of the kettle, so as to provide two or more supports for the kettle. Brackets 216 are then bolted to the spacers 215, the bolts 217 passing through the casing 186, the latter being clamped in fluid-tight relation between the spacers and the brackets, thus providing an amply strong support and maintaining the casing 185 fluid tight at the points of support.

In all the various modifications of this invention, a fundamental principle is common to all. Each has a flexible compressible partition structure to form, in the annular space between the heat-conducting wall and the casing spaced from that wall, an elongated passage or passages, the partitions being associated with, that is, integral with or attached to, the casing and being held, when the heat-exchanger is in operation, in resilient compressive contact with the heat-conducting wall. The means for holding the partitions in compressive contact with the heat-conducting wall may vary. Fluid pressure acting on a flexible casing on the side opposite to that from which the partitions project will cause such resilient compressive contact as in the structures of Figs. 1 to 7. Again, where the casing is rigid, the ratio of the height of the flexible partition to the radial height of the annular space between the casing and the heat-conducting wall is designed to be such as to maintain a desired degree of compression between the wall-contacting edge of the partition and wall. Or, the partition may be angle-shaped and so positioned that the differential pressures on each side of the partition, caused by the flow of heat-transfer fluid through the casing, cause a lip-sealing pressure by urging the free edge of the partition in pressure-sealing contact, as in Figs. 8 and 13. It is also possible to utilize spring devices, as in Figs. 3e and 3f, to assist in maintaining resilient contact of partition and heat-conducting wall. In fact, any combination of the above factors may be employed, the invention residing in the utilization of flexible compressible partitions, unattached to the heat-conducting wall of the heat-exchanger but held in a positive resilient compressive contact with said heat-conducting wall.

Again, in all the various modifications of this invention, there is an outstanding advantage over prior heat-exchangers, namely, the casing and circulation partitions may be removed for cleansing, both the heat-conducting wall and the casing and partitions, of accumulated film, scum, dirt, etc., all of which cut down the efficiency of a heat-exchanger, and the casings and partitions readily reassembled in operative relation with the heat-conducting wall without damage to any of the parts.

The above embodiments of this application are to be understood as illustrative only and not in limitation of the invention herein disclosed, which is capable of being varied by one skilled in the art without departing from the spirit of the invention as defined in the appended claims.

This application is a continuation in part of my copending application, Serial No. 187,253, filed September 28, 1950, now abandoned.

What is claimed is:

1. In heat transfer apparatus, the combination comprising a cylindrical metal body having a cylindrical cavity therein with communicating openings of reduced diameter extending through the ends of the said body, a flexible and collapsible bag for insertion into said cavity in a collapsed condition and having a surface when expanded cooperating with the cavity-defining surface of said body to define a passage for conducting a heat transfer fluid through said cavity, a pipe for delivering fluid pressure to the interior of said bag to expand the same in said cavity, means mounting the bag on said pipe so that it may be positioned in said cavity by axial movement of the pipe through said reduced openings, and means for simultaneously admitting and discharging the heat transfer fluid into and out of the said passage, said pipe being operative to deliver the heat transfer fluid to said passage.

2. Heat-transfer apparatus comprising, in combination, a heat-conducting wall member through which heat is to be transferred by means of a heat-transfer fluid medium, a flexible and deformable member spaced from and cooperating with said wall member to define a space through which the fluid medium may circulate, one side of said flexible member having an elastically-deformable rib structure thereon extending transversely of said space to form a tortuous passage for the movement of the fluid medium therethrough, fluid pressure means for applying pressure to the other side of said flexible member for holding the said rib structure in compressive deformation against said wall member and said flexible member against movement away from said wall member by the pressure of the fluid medium flowing through said passage, and means for simultaneously admitting and discharging the fluid medium into and out of said passage.

3. Heat-transfer apparatus comprising, in combination, a heat-conducting wall member through which heat is to be transferred by means of a heat-transfer fluid medium, a flexible and deformable member spaced from and cooperating with said wall member to define a space on one side of said flexible member through which the fluid medium may circulate, one of said members having an elastically-deformable rib structure thereon extending transversely of said space to form a tortuous passage for the movement of the fluid medium therethrough, fluid pressure means for applying pressure to the other side of said flexible member for holding the said rib structure in compressive deformation against said wall member and said flexible member against movement from said wall member by the pressure of the fluid medium flowing through said passage, and means for simultaneously admitting and discharging the fluid medium into and out of said passage.

4. Heat-transfer apparatus comprising, in combination, a heat-conducting wall member through which heat is to be transferred by means of a heat-transfer fluid medium, a flexible and deformable member spaced from and cooperating with said wall member to define a space on one side of said flexible member through which the fluid medium may circulate, one of said members having an elastically-deformable rib structure thereon extending transversely of said space to form a tortuous passage for movement of the fluid medium therethrough, a fluid pressure chamber including the other side of said flexible member for pressurizing said other side to maintain the said rib structure in compressive deformation against said wall member and said flexible member against movement away from said wall member, and means for simultaneously admitting and discharging the fluid medium into and out of the said passage.

5. Heat-transfer apparatus comprising, in combination, a heat-conducting wall member through which heat is to be transferred by means of a heat-transfer fluid medium, a flexible and deformable member spaced from and cooperating with said wall member to define a space through which the fluid medium may circulate, an elastically-deformable rib structure integrally connected with one side of said flexible member and extending transversely of said space and having its outer edge in abutting engagement with said wall member, said rib structure forming a tortuous passage in said space for the movement of the fluid medium therethrough, fluid pressure means for applying pressure to the other side of said flexible member for holding said rib structure outer edge in abutting engagement with said wall member, and means for simultaneously admitting and discharging the fluid medium into and out of said passage.

6. Heat-transfer apparatus comprising, in combination, a heat-conducting wall member through which heat is to be transferred by means of a heat-transfer fluid medium, a flexible and deformable member spaced from and cooperating with said wall member to define a space through which the fluid medium may circulate, a rib structure positioned between said wall member and one side of said flexible member and cooperating therewith to form a tortuous passage for the movement of the fluid medium through said space, fluid pressure means for applying pressure to the other side of said flexible member for holding said rib structure in pressure contact against said wall member and said flexible member against movement away from said wall member by the pressure of the fluid medium flowing through said passage, and means for simultaneously admitting and discharging the fluid medium into and out of said passage.

7. The invention defined in claim 6 characterized by said rib structure comprising a spiral rib and said passage being a spiral passage.

8. In heat-transfer apparatus for a structure having a cylindrical heat-conducting wall closed at each end except for a relatively small opening, and defining a cavity through which a heat-transfer fluid medium is to be conducted, a collapsible generally cylindrical bag normally of a shape similar to that of the cavity and of a size somewhat smaller than that of the cavity, said bag being capable of being readily collapsed for insertion into the cavity through the relatively small opening and thereafter of being expanded to normal cylindrical condition, in which position within the cavity the said bag and the inner surface of the cavity define an annular space of a cross-sectional area less than the cross-sectional area of the cavity for the passage of fluid medium through the cavity, and means for simultaneously admitting and discharging the fluid medium into and out of the said annular space.

9. A heat-transfer apparatus, in combination, a hollow cylindrical roll having a cylindrical cavity therein with an axial opening into said cavity of smaller diameter than that of the cavity, a collapsible cylindrical bag insertable through said opening into said cavity, said collapsible bag when within said cavity being expandable to its normal cylindrical condition and to a position in which it defines with the inner cylindrical surface of the cavity an annular space, said collapsible bag having a rib structure on its outer surface which when the said bag is expanded defines a tortuous passage through said annular space, and means for expanding said cylindrical bag and for simultaneously admitting and discharging the heat-transfer fluid medium into and out of said passage.

10. In heat-transfer apparatus, in combination, a hollow metal cylinder having a relatively thin cylindrical wall through which heat is to be conducted by means of a heat-transfer fluid medium and a relatively small axial opening into the cavity within the hollow cylinder, a collapsible generally cylindrical bag for insertion into said cavity in a collapsed condition and having a surface when expanded to normal condition defining with the inner surface of the hollow metal cylinder an annular passage for conducting heat-transfer fluid medium therethrough in heat-transfer contact with the said inner surface of the hollow metal cylinder, a pipe for delivering fluid under pressure to the interior of said bag to expand the bag to normal cylindrical condition within the cavity, means for mounting the said bag on said pipe so that the said bag in collapsed condition may be positioned within the cavity by axial movement of the pipe through said relatively small axial opening, and means for simultaneously admitting and discharging the heat-transfer medium into and out of the said annular passage.

11. Heat-transfer apparatus comprising, in combination, a hollow cylindrical body having a cylindrical cavity therein with an axial opening of smaller diameter than said cavity providing access to the said cavity, a flexible cylindrical bag within said cylindrical cavity and having an outer cylindrical surface defining with the inner surface of the cylindrical cavity an annular space through which a heat-transfer medium may be conducted in heat-conductive relation to the cylindrical wall of the hollow cylindrical body, and an elastically-deformable rib structure positioned within said annular space and so disposed as to define a tortuous path for the passage of the heat-transfer medium, a pipe having an external diameter considerably smaller than that of the said axial opening, means for mounting the cylindrical bag on the pipe so that the said bag in collapsed condition may by axial movement of the pipe be introduced into the cylindrical cavity and withdrawn therefrom, means for delivering fluid under pressure through said pipe into said bag to expand it to normal cylindrical condition and for simultaneously admitting and discharging fluid into and out of said tortuous passage.

References Cited in the file of this patent

UNITED STATES PATENTS

| | | |
|---|---|---|
| 111,141 | Nussey et al. | Jan. 24, 1871 |
| 601,877 | Lochmann | Apr. 5, 1898 |
| 654,358 | Roderwald | July 24, 1900 |
| 1,631,721 | Boischevalier | June 7, 1927 |
| 1,815,938 | Trogner | July 28, 1931 |
| 2,025,757 | Lindsey | Dec. 31, 1935 |
| 2,058,780 | Elliott | Oct. 27, 1936 |
| 2,224,632 | Giles | Dec. 10, 1940 |
| 2,356,779 | Morrison | Aug. 29, 1944 |
| 2,381,617 | Phelan | Aug. 7, 1945 |
| 2,425,599 | Cox | Aug. 12, 1947 |
| 2,572,320 | Cox et al. | Oct. 23, 1951 |
| 2,625,804 | Patch et al. | Jan. 20, 1953 |

FOREIGN PATENTS

| | | |
|---|---|---|
| 15,535 | Great Britain | 1907 |
| 145,025 | Great Britain | June 14, 1920 |
| 454,325 | Great Britain | Sept. 28, 1936 |